US011974516B2

(12) United States Patent
Thomas et al.

(10) Patent No.: US 11,974,516 B2
(45) Date of Patent: May 7, 2024

(54) SUPPORT SYSTEM FOR AN AGRICULTURAL HEADER

(71) Applicant: CNH Industrial America LLC, New Holland, PA (US)

(72) Inventors: Jeffrey D. Thomas, Gordonville, PA (US); Joel Timothy Cook, Akron, PA (US)

(73) Assignee: CNH Industrial America LLC, New Holland, PA (US)

( * ) Notice: Subject to any disclaimer, the term of this patent is extended or adjusted under 35 U.S.C. 154(b) by 968 days.

(21) Appl. No.: 16/724,708

(22) Filed: Dec. 23, 2019

(65) Prior Publication Data

US 2021/0185881 A1 Jun. 24, 2021

(51) Int. Cl.
*A01D 34/24* (2006.01)
*A01B 63/10* (2006.01)
*A01D 34/28* (2006.01)
*A01D 41/14* (2006.01)

(52) U.S. Cl.
CPC ............ *A01B 63/10* (2013.01); *A01D 34/246* (2013.01); *A01D 34/28* (2013.01); *A01D 41/141* (2013.01)

(58) Field of Classification Search
CPC .... A01D 34/28; A01D 34/246; A01D 41/141; A01D 41/14; A01D 61/00–61/04; A01D 67/00–67/04
See application file for complete search history.

(56) References Cited

U.S. PATENT DOCUMENTS

| 7,162,854 | B2 | 1/2007 | Yeomans et al. |
| 7,252,169 | B2 | 8/2007 | McLean et al. |
| 7,520,115 | B2 | 4/2009 | Coers et al. |
| 7,877,976 | B2* | 2/2011 | Honas .................... A01D 41/14 56/208 |
| 7,992,374 | B1* | 8/2011 | Bich .................... A01D 41/141 56/208 |
| 8,794,344 | B2* | 8/2014 | Blunier .................. A01C 7/205 172/326 |
| 8,919,789 | B2 | 12/2014 | Nelson et al. |
| 9,402,343 | B1* | 8/2016 | Allochis ............... A01D 34/283 |
| 10,257,981 | B2* | 4/2019 | Allochis ................ A01D 57/20 |
| 10,299,434 | B2* | 5/2019 | Yanke .................... A01D 43/06 |
| 10,820,511 | B2* | 11/2020 | Brimeyer ............... A01B 63/10 |

(Continued)

FOREIGN PATENT DOCUMENTS

WO 2019055521 3/2019

*Primary Examiner* — Alicia Torres
*Assistant Examiner* — Madeline I Runco
(74) *Attorney, Agent, or Firm* — Peter K. Zacharias; Rebecca L. Henkel; Rickard K. DeMille

(57) ABSTRACT

A support system for an agricultural header includes a first actuator configured to couple to a frame of the agricultural header and to a first element of the agricultural header. The support system also includes a second actuator configured to couple to the frame of the agricultural header and to a second element of the agricultural header. Furthermore, the support system includes a third actuator configured to couple to the frame of the agricultural header and to the second element of the agricultural header. The support system also includes a fluid supply system configured to provide pressurized fluid to the first actuator and to the second actuator. The third actuator is fluidly isolated from the fluid supply system, the first actuator, and the second actuator.

20 Claims, 8 Drawing Sheets

(56) References Cited

U.S. PATENT DOCUMENTS

| | | | |
|---|---|---|---|
| 11,064,654 B2* | 7/2021 | Vandeven | A01D 41/141 |
| 2017/0215342 A1* | 8/2017 | Allochis | A01D 57/20 |
| 2019/0029176 A1* | 1/2019 | Yanke | A01D 57/04 |
| 2020/0344951 A1* | 11/2020 | Vandeven | A01D 41/141 |
| 2022/0346316 A1* | 11/2022 | Schrattenecker | A01D 57/04 |

* cited by examiner

SUPPORT SYSTEM FOR AN AGRICULTURAL HEADER

BACKGROUND

The present disclosure relates generally to a support system for an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing a plant from a field, such as by using a header. The header may cut the agricultural crops and transport the cut crops to a processing system of the combine.

Certain headers include a cutter bar assembly configured to cut a portion of each crop (e.g., a stalk), thereby separating the cut crop from the soil. The cutter bar assembly may extend along a substantial portion of the width of the header at a forward end of the header. In addition, the cutter bar assembly may include a blade support, a stationary guard assembly, and a moving blade assembly. The moving blade assembly may be fixed to the blade support, and the blade support/moving blade assembly may be driven to oscillate relative to the stationary guard assembly. The moving blade assembly may include multiple blades distributed along the width of the moving blade assembly, and the stationary guard assembly may include multiple guards distributed along the width of the stationary guard assembly. As the moving blade assembly is driven to oscillate, the blades of the moving blade assembly move relative to the guards of the stationary guard assembly. As the header is moved through the field by the harvester, a portion of a crop (e.g., the stalk) may enter a gap between adjacent guards of the stationary guard assembly and a gap between adjacent blades of the moving blade assembly. Movement of the moving blade assembly causes a blade of the moving blade assembly to move across the gap in the stationary guard assembly, thereby cutting the portion of the crop.

Certain cutter bar assemblies are flexible along the width of the header. Such a cutter bar assembly may be supported by an infeed deck and multiple longitudinally extending arms distributed along the width of the header. The infeed deck and each arm may be pivotally mounted to a frame of the header, thereby enabling the cutter bar assembly to flex during operation of the harvester. The flexible cutter bar assembly may follow the contours of the field, thereby enabling the cutting height to be substantially constant along the width of the header. Certain headers include multiple air bags to support the arms and the infeed deck (e.g., to urge the infeed deck and the arms upwardly, thereby reducing a contact force between the cutter bar assembly and the surface of the field). For example, one air bag may be coupled to each arm, multiple air bags may be coupled to the infeed deck, and each air bag may be coupled to the frame of the header. The contact force between the cutter bar assembly and the surface of the field may be adjusted by controlling the air pressure within the air bags. The air bags are generally fluidly coupled to one another, such that a single air pressure is established within each of the air bags. Unfortunately, due to the difference in weight between the infeed deck and the arms, the contact force between the cutter bar assembly and the soil surface at the infeed deck may be different than the contact force between the cutter bar assembly and the soil surface at the arms for a selected air bag air pressure. As a result, at least a portion of the cutter bar assembly may not effectively follow the contours of the surface of the field.

BRIEF DESCRIPTION

In certain embodiments, a support system for an agricultural header includes a first actuator configured to couple to a frame of the agricultural header and to a first element of the agricultural header. The support system also includes a second actuator configured to couple to the frame of the agricultural header and to a second element of the agricultural header, in which the first element and the second element are movable relative to the frame, and the first element and the second element are movable relative to one another. Furthermore, the support system includes a third actuator configured to couple to the frame of the agricultural header and to the second element of the agricultural header. The support system also includes a fluid supply system configured to provide pressurized fluid to the first actuator and to the second actuator. The third actuator is fluidly isolated from the fluid supply system, the first actuator, and the second actuator.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
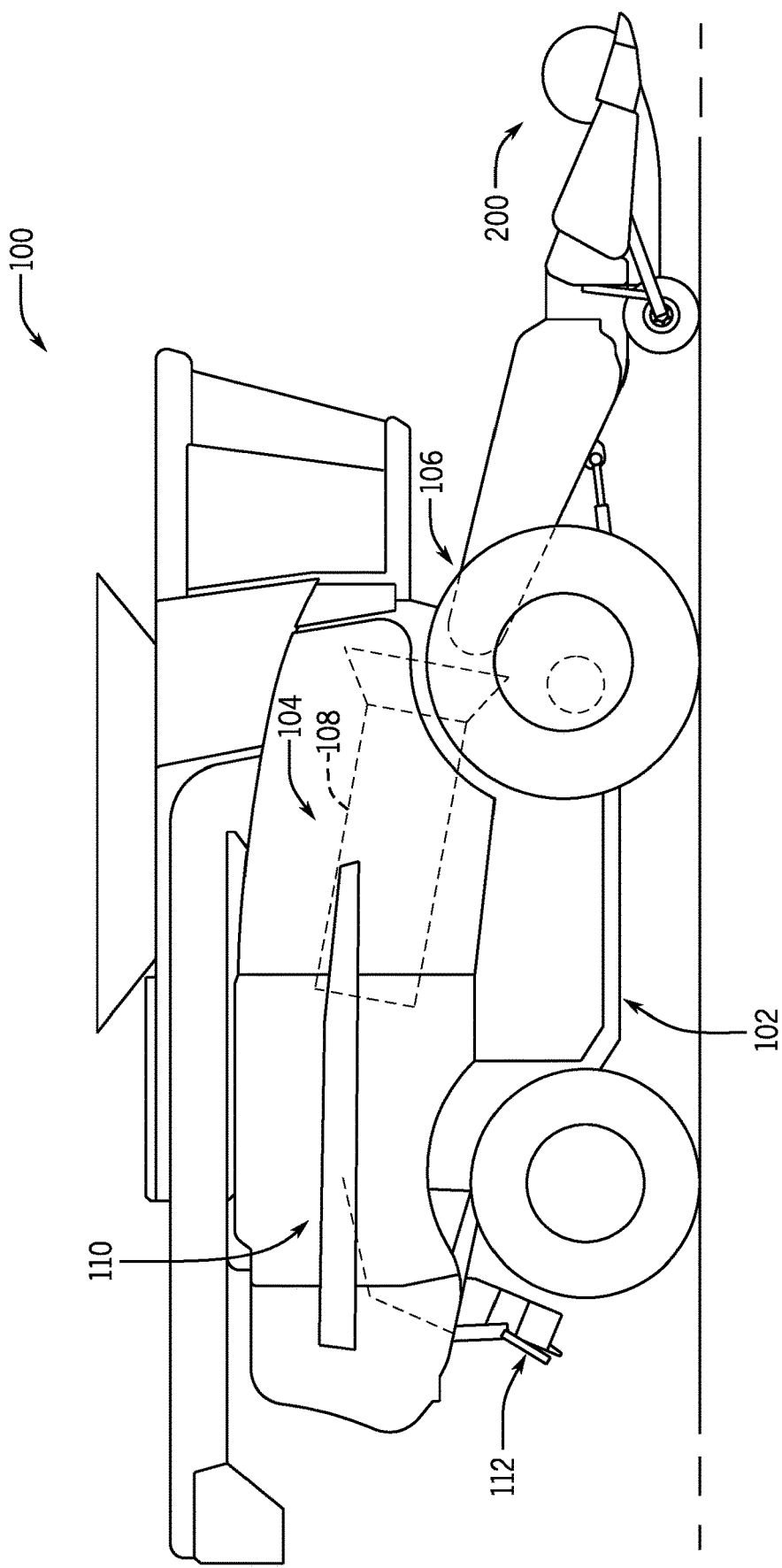
FIG. 1 is a side view of an embodiment of an agricultural harvester having a header.

Turning to the drawings, FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the cut crops toward an inlet 106 of the agricultural crop processing system 104 for further processing of the cut crops. The agricultural crop processing system 104 receives cut crops from the header 200 and separates desired crop material from crop residue. For example, the agricultural crop processing system 104 may include a thresher 108 having a cylindrical threshing rotor that transports the crops in a helical flow path through the harvester 100. In addition to transporting the crops, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. The cutter bar assembly is configured to flex along a width of the header to enable the cutter bar assembly to substantially follow the contours of the field. The cutter bar assembly is supported by multiple longitudinally extending arms distributed along the width of the header and by an infeed deck positioned at the center of the header. The arms and the infeed deck are movably/pivotally mounted to a frame of the header, thereby enabling the cutter bar assembly to flex. In certain embodiments, the pivoting movement of each arm and the infeed deck may be blocked, thereby substantially reducing the flexibility of the cutter bar assembly (e.g., if a substantially rigid cutter bar is desired for certain field conditions, for harvesting certain types of crops, etc.).

In certain embodiments, the header includes a pneumatic support system configured to urge the cutter bar assembly upwardly, thereby reducing a contact force between the cutter bar assembly and the surface of the field. The pneumatic support system may include a first air bag coupled to the frame of the header and to a respective arm of the header. In addition, the pneumatic support system may include a second air bag coupled to the frame of the header and to the infeed deck. The pneumatic support system may also include a third air bag coupled to the frame of the header and to the infeed deck. Furthermore, the pneumatic support system may include a pneumatic supply system configured to provide pressurized air to the first air bag and to the second air bag. In response to receiving the pressurized air, the first air bag and the second air bag may urge the arm and the infeed deck upwardly, thereby reducing the contact force between the cutter bar assembly and the surface of the field. The third air bag may also urge the infeed deck upwardly to reduce the contact force between the cutter bar assembly and the surface of the field at the infeed deck. However, the third air bag may be pneumatically isolated from the pneumatic supply system, the first air bag, and the second air bag. As such, the air pressure within the third air bag may be controlled independently of the air pressure within the first and second air bags to offset a portion of the weight of the infeed deck. For example, prior to operation of the header, the air pressure within the third air bag may be controlled such that the contact force between the cutter bar assembly and the soil surface at the infeed deck is substantially equal to the contact force between the cutter bar assembly and the soil surface at the arm. During operation of the header, the contact force between the cutter bar assembly and the soil surface may be substantially equal across the cutter bar assembly (e.g., even as the contact force is adjusted by controlling the air pressure within the first and second air bags) because a portion of the weight of the infeed deck is offset by the third air bag. Accordingly, each portion of the cutter bar assembly may effectively follow the contours of the surface of the field.

Figure 2:
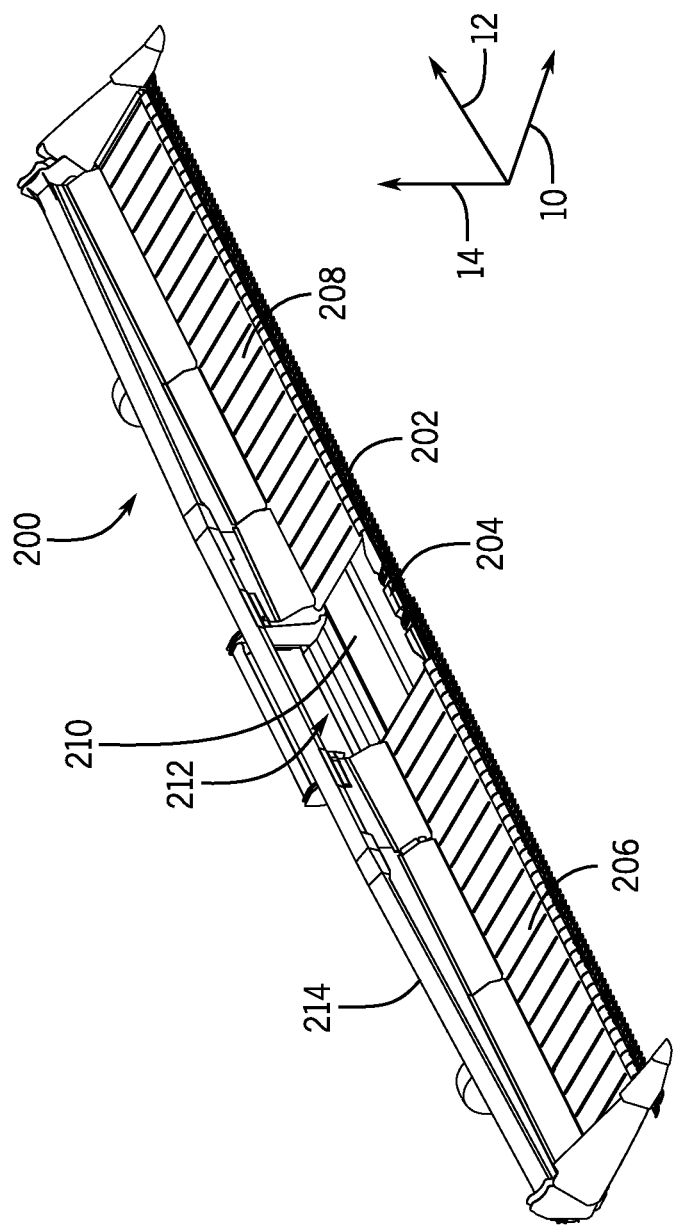
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 relative to a longitudinal axis 10 of the header 200. As illustrated, the cutter bar assembly 202 extends along a substantial portion of the width of the header 200 (e.g., the extent of the header 200 along a lateral axis 12). As discussed in detail below, the cutter bar assembly includes a blade support, a stationary guard assembly, and a moving blade assembly. The moving blade assembly is fixed to the blade support (e.g., above the blade support relative to a vertical axis 14 of the header 200), and the blade support/moving blade assembly is driven to oscillate relative to the stationary guard assembly. In the illustrated embodiment, the blade support/moving blade assembly is driven to oscillate by a driving mechanism 204 positioned at the lateral center of the header 200. However, in other embodiments, the blade support/moving blade assembly may be driven by another suitable mechanism (e.g., located at any suitable position on the header). As the harvester is driven through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side of the header 200 and a second lateral belt 208 on a second lateral side of the header 200, opposite the first lateral side. Each belt is driven to rotate by a suitable drive mechanism, such as an electric motor or a hydraulic motor. The first lateral belt 206 and the second lateral belt 208 are driven such that the top surface of each belt moves laterally inward. In addition, the header 200 includes a longitudinal belt 210 positioned between the first lateral belt 206 and the second lateral belt 208 along the lateral axis 12. The longitudinal belt 210 is driven to rotate by a suitable drive mechanism, such as an electric motor or a hydraulic motor. The longitudinal belt 210 is driven such that the top surface of the longitudinal belt 210 moves rearwardly along the longitudinal axis 10. In certain embodiments, the crops cut by the cutter bar assembly 202 are directed toward the belts by a reel assembly. Agricultural crops that contact the top surface of the lateral belts are driven laterally inwardly to the longitudinal belt due to the movement of the lateral belts. In addition, agricultural crops that contact the longitudinal belt 210 and the agricultural crops provided to the longitudinal belt by the lateral belts are driven rearwardly along the longitudinal axis 10 due to the movement of the longitudinal belt 210. Accordingly, the belts move the cut agricultural crops through an opening 212 in the header 200 to the inlet of the agricultural crop processing system.

In the illustrated embodiment, the cutter bar assembly 202 is flexible along the width of the header 200 (e.g., the extent of the header 200 along the lateral axis 12). The cutter bar assembly 202 is supported by an infeed deck and multiple arms. The arms extend along the longitudinal axis 10 and are distributed along the width of the header 200 (e.g., along the lateral axis 12 of the header 200). Each arm is mounted to a frame 214 of the header 200 and configured to rotate about a pivot axis relative to the frame. In addition, the infeed deck is mounted to a laterally central portion of the frame 214 and is configured to rotate about a pivot axis relative to the frame. As a result, the cutter bar assembly 202 may flex during operation of the harvester. The flexible cutter bar assembly may follow the contours of the field, thereby enabling the cutting height (e.g., the height at which each crop is cut) to be substantially constant along the width of the header 200 (e.g., the extent of the header 200 along the lateral axis 12). In certain embodiments, the pivoting movement of each arm and the infeed deck may be blocked, thereby substantially reducing the flexibility of the cutter bar assembly (e.g., if a substantially rigid cutter bar is desired for certain field conditions, for harvesting certain types of crops, etc.).

In the illustrated embodiment, the arms extends through the first lateral belt 206 and the second lateral belt 208. Accordingly, the first lateral belt 206 extends around a first portion of the arms, and the second lateral belt 208 extends around a second portion of the arms. The arms are configured to support the lateral belts during operation of the header. Furthermore, the longitudinal belt 210 is supported by the infeed deck. For example, the longitudinal belt 210 may extend around bars of the infeed deck, and the bars may support the longitudinal belt 210 during operation of the header.

Figure 3:
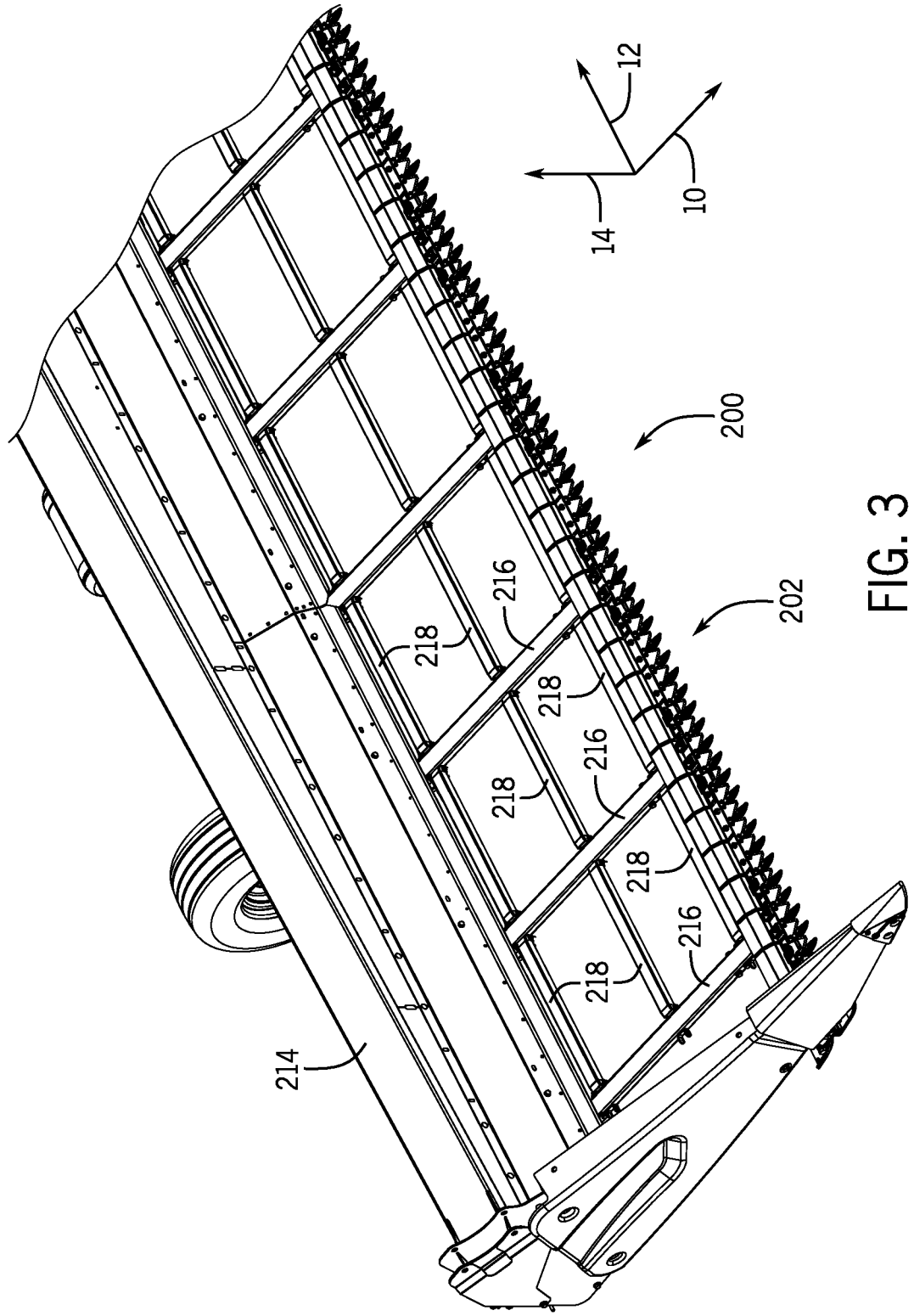
FIG. 3 is a perspective view of a portion of the header of FIG. 2, including a cutter bar assembly and arms that support the cutter bar assembly.

FIG. 3 is a perspective view of a portion of the header 200 of FIG. 2, including the cutter bar assembly 202 and arms 216 that support the cutter bar assembly 202. As illustrated, each arm 216 extends substantially along the longitudinal axis 10. However, in alternative embodiments, each arm may extend in any suitable direction. In the illustrated embodiment, the arms 216 are distributed along the width of the header 200 (e.g., the extent of the header along the lateral axis 12). The spacing between the arms may be selected to enable the arms to support the cutter bar assembly and to enable the cutter bar assembly to flex during operation of the header (e.g., while the cutter bar assembly is in the flexible configuration). Each arm 216 is pivotally coupled to the frame 214 via a respective pivot joint, and the pivot joint is configured to enable the respective arm 216 to rotate relative to the frame 214 about a respective pivot axis. In the illustrated embodiment, lateral supports 218 extend between respective pairs of arms 216. A first end of each lateral support 218 is pivotally coupled to one arm 216, and a second end of each lateral support 218 is pivotally coupled to another arm 216. The lateral supports 218 are configured to support the respective lateral belt, while enabling the arms to rotate about the respective pivot axes relative to the frame 214. While three lateral supports are positioned between each pair of arms in the illustrated embodiment, in other embodiments, more or fewer lateral supports may be positioned between at least one pair of arms (e.g., 1, 2, 3, 4, 5, 6, etc.). Furthermore, in certain embodiments, the lateral supports may be omitted between at least one pair of arms.

Figure 4:
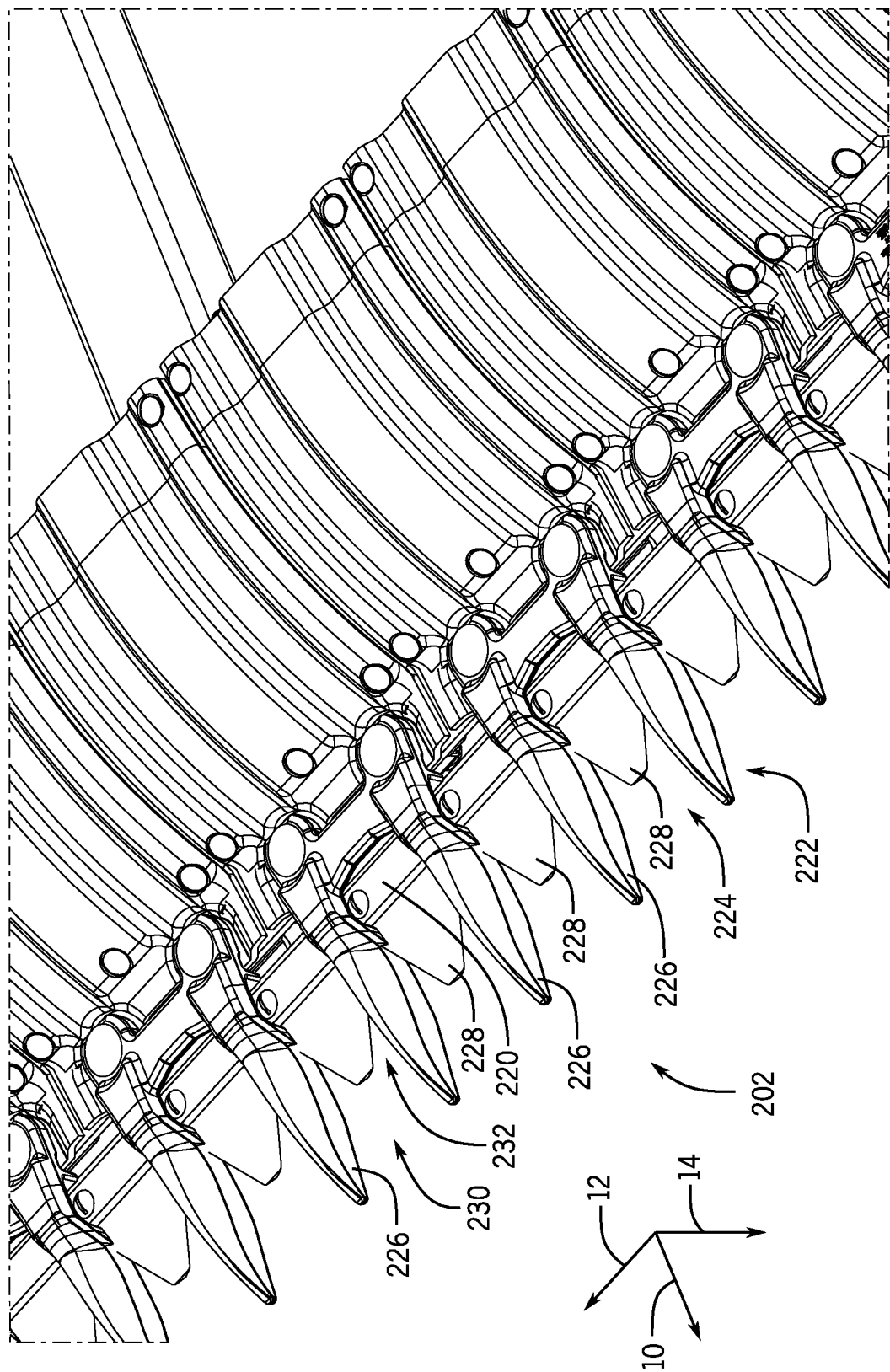
FIG. 4 is a perspective view of the cutter bar assembly of FIG. 3.

FIG. 4 is a perspective view of the cutter bar assembly 202 of FIG. 3. As illustrated, the cutter bar assembly 202 includes a blade support 220, a stationary guard assembly 222, and a moving blade assembly 224. The moving blade assembly 224 is coupled to the blade support 220, and the blade support 220/moving blade assembly 224 are driven to oscillate relative to the stationary guard assembly 222. The stationary guard assembly 222 includes multiple stationary guards 226 distributed along the width of the stationary guard assembly 222 (e.g., the extent of the stationary guard assembly 222 along the lateral axis 12), and the moving blade assembly 224 includes multiple moving blades 228 distributed along the width of the moving blade assembly 224 (e.g., the extent of the moving blade assembly 224 along the lateral axis 12). As the moving blade assembly 224 is driven to oscillate, the moving blades 228 move relative to the stationary guards 226. As the header is moved through the field by the harvester, a portion of a crop (e.g., the stalk) may enter a gap 230 between adjacent stationary guards 226 and a gap 232 between adjacent moving blades 228. Movement of the moving blade assembly 224 causes a moving blade 228 to move across the gap 230 in the stationary guard assembly 222, thereby cutting the portion of the crop.

In the illustrated embodiment, the stationary guard assembly 222 is coupled to the arms via laterally extending support bars. For example, in certain embodiments, the support bars are coupled to the arms via fasteners, and the stationary guards of the stationary guard assembly are coupled to respective support bars by fasteners. In addition, the blade support 220 and the movable blade assembly 224 are movably coupled to the stationary guard assembly 222 (e.g., the blade support and the moving blade assembly pass through openings in the stationary guards). The support bars and the blade support 220 are flexible, thereby enabling the cutter bar assembly 202 to flex in response to variations in the soil surface (e.g., while the cutter bar assembly 202 is in contact with the soil surface). While the cutter bar assembly 202 is coupled to arms via support bars and fasteners in the illustrated embodiment, in other embodiments, the cutter bar assembly may be coupled to the arms via another suitable connection system (e.g., the stationary guard assembly may be welded to the arms, etc.). In addition, the blade support/moving blade assembly may be movably coupled to the stationary guard assembly by any suitable connection system.

Figure 5:
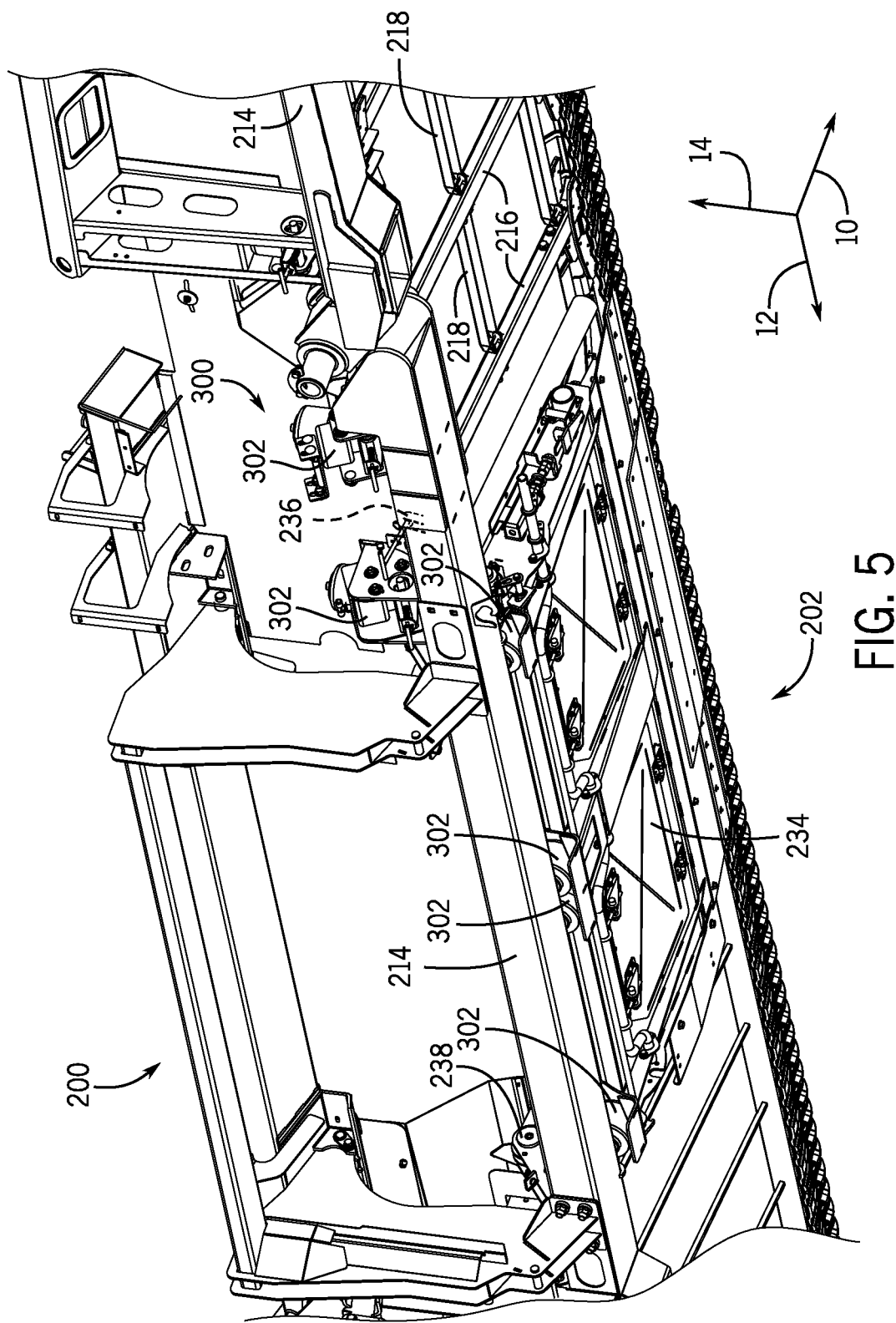
FIG. 5 is a rear perspective view of a portion of the header of FIG. 2, including a pneumatic support system having air bags configured to support an infeed deck and the arms.

FIG. 5 is a rear perspective view of a portion of the header 200 of FIG. 2, including a pneumatic support system 300 (e.g., support system) having air bags 302 (e.g., actuators) configured to support an infeed deck 234 and the arms 216. In the illustrated embodiment, each arm 216 is pivotally coupled to the frame 214 via a respective pivot joint 236, and each pivot joint 236 is configured to enable the respective arm 216 to rotate relative to the frame 214 about a respective pivot axis. In addition, the infeed deck 234 is pivotally coupled to the frame 214 via pivot joints 238, and the pivot joints 238 are configured to enable the infeed deck 234 to rotate relative to the frame 214 about a pivot axis. Accordingly, the infeed deck 234 is movable/pivotable relative to the arms 216, and the arms 216 are movable/pivotable relative to one another. As illustrated, the arms 216 and the infeed deck 234 are coupled to the cutter bar assembly 202, thereby movably coupling the cutter bar assembly 202 to the frame 214 of the header 200. While the arms 216 and the infeed deck 234 are pivotally coupled to the frame 214 by respective point joints in the illustrated embodiment, in other embodiments, the infeed deck and/or at least one arm may be movably/pivotally coupled to the frame of the header by another suitable mechanism. For example, in certain embodiments, the infeed deck and/or at least one arm may be movably coupled to the header frame by one or more respective leaf springs.

In the illustrated embodiment, one air bag 302 of the pneumatic support system 300 is coupled to each arm 216, and four air bags 302 of the pneumatic support system 300 are coupled to the infeed deck 234. In addition, each air bag 302 is coupled to the frame 214 of the header 200. The air bags 302 are configured to urge the infeed deck 234 and the arms 216 upwardly, thereby reducing the contact force between the cutter bar assembly 202 and the surface of the field. For example, air pressure within the air bags may be controlled to adjust the contact force between the cutter bar assembly and the field surface. While one air bag is coupled to each arm in the illustrated embodiment, in other embodiments, multiple air bags may be coupled to at least one arm. Furthermore, in certain embodiments, multiple arms (e.g., 2, 3, 4, or more) may be coupled to a single air bag or group of air bags via a suitable linkage. In addition, while four air bags are coupled to the infeed deck in the illustrated embodiment, in other embodiments, more or fewer air bags may be coupled to the infeed deck.

As discussed in detail below, one or more air bags coupled to the infeed deck may be pneumatic isolated from the remainder of the air bags. For example, the air bags 302 coupled to the arms 216 and the outer two air bags 302 coupled to the infeed deck 234 may be fluidly coupled to a pneumatic supply system, and the pneumatic supply system may provide pressurized air to the air bags 302 coupled to the arms 216 and the outer two air bags 302 coupled to the infeed deck 234. In addition, the inner two air bags 302 coupled to the infeed deck 234 may be pneumatically isolated from the pneumatic supply, the air bags 302 coupled to the arms, and the outer two air bags 302 coupled to the infeed deck 234. Accordingly, the air pressure within the inner two air bags 302 may be controlled independently of the air pressure within the outer two air bags 302 and the air bags 302 coupled to the arms 216. For example, prior to harvesting operations (e.g., during the manufacturing process of the header, before daily field operations, at periodic intervals, in response to changing the configuration of the header, etc.), the air pressure within the inner two air bags 302 may be controlled such that the contact force between the cutter bar assembly and the soil surface at the infeed deck 234 is substantially equal to the contact force between the cutter bar assembly and the soil surface at the arms (e.g., while the outer two air bags 302 and the air bags 302 coupled to the arms 216 are pressurized to a standard operating pressure, such as an average air pressure during harvesting operations). As such, the inner two air bags 302 offset a portion of the weight of the infeed deck 234. During operation of the header, the contact force between the cutter bar assembly 202 and the soil surface may be substantially equal across the cutter bar assembly (e.g., even as the contact force is adjusted by controlling the air pressure within the outer two air bags and the air bags coupled to the arms) because a portion of the weight of the infeed deck is offset by the inner two air bags. Accordingly, each portion of the cutter bar assembly may effectively follow the contours of the surface of the field.

Figure 6A:
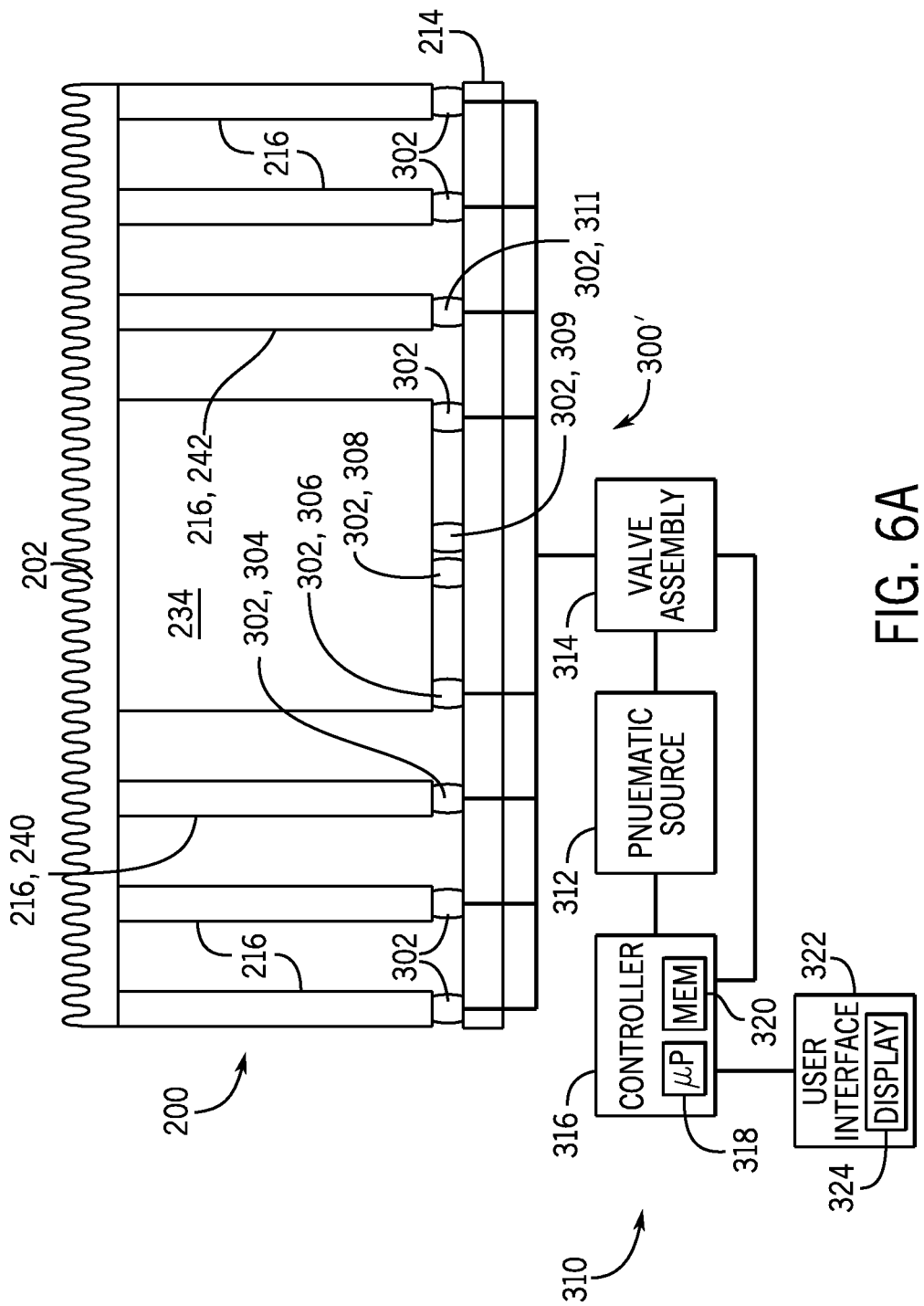
FIG. 6A is a schematic diagram of an embodiment of a pneumatic support system that may be employed within the header of FIG. 2.

FIG. 6A is a schematic diagram of an embodiment of a pneumatic support system 300' that may be employed within the header 200 of FIG. 2. As previously discussed, each arm 216 is pivotally/movably coupled to the frame 214 of the header 200, and the infeed deck 234 is pivotally/movably coupled to the frame 214 of the header 200. In addition, the infeed deck 234 and the arms 216 are movable relative to one another and support the cutter bar assembly 202 during operation of the header 200. In the illustrated embodiment, a first air bag 304 (e.g., first actuator) is coupled to the frame 214 of the header 200 and to a first arm 240 (e.g., first element) of the header 200. In addition, a second air bag 306 (e.g., second actuator) is coupled to the frame 214 of the header 200 and to the infeed deck 234 (e.g., second element) of the header 200. Furthermore, a third air bag 308 (e.g., third actuator) and a fourth air bag 309 (e.g., fourth actuator) are coupled to the frame 214 of the header 200 and to the infeed deck 234 of the header 200. A fifth air bag 311 (e.g., fifth actuator) is coupled to the frame 214 of the header 200 and to a second arm 242 (e.g., third element) of the header 200.

In the illustrated embodiment, the pneumatic support system 300' includes a pneumatic supply system 310 (e.g., fluid supply system) configured to provide pressurized air (e.g., pressurized fluid) to the first air bag 304, to the second air bag 306, and to the fifth air bag 311. The pneumatic supply system 310 includes a pneumatic source 312 (e.g., fluid source) and a valve assembly 314 fluidly disposed between the pneumatic source 312 and the first, second, and fifth air bags. The valve assembly 314 is configured to control pressure within the first air bag 304, the second air bag 306, and the fifth air bag 311. The valve assembly may include one or more valves of any suitable type(s) (e.g., ball valve(s), butterfly valve(s), needle valve(s), etc.) to control air flow between the pneumatic source 312 and the first, second, and fifth air bags. The valve assembly may also include one or more check valves and/or other suitable components to facilitate control of the air flow to the air bags 302. Furthermore, the pneumatic source 312 may include any suitable device(s) configured to provide pressurized air to the air bags 302, such as a pneumatic tank and/or a pneumatic pump.

In the illustrated embodiment, the pneumatic support system 300' includes a controller 316 communicatively coupled to the pneumatic source 312 and to the valve assembly 314. In certain embodiments, the controller 316 is an electronic controller having electrical circuitry configured to control the pneumatic source 312 and/or the valve assembly 314. In the illustrated embodiment, the controller 316 includes a processor, such as the illustrated microprocessor 318, and a memory device 320. The controller 316 may also include one or more storage devices and/or other suitable components. The processor 318 may be used to execute software, such as software for controlling the pneumatic source 312 and/or the valve assembly 314, and so forth. Moreover, the processor 318 may include multiple microprocessors, one or more "general-purpose" microprocessors, one or more special-purpose microprocessors, and/ or one or more application specific integrated circuits (ASICS), or some combination thereof. For example, the processor 318 may include one or more reduced instruction set (RISC) processors.

The memory device 320 may include a volatile memory, such as random access memory (RAM), and/or a nonvolatile memory, such as read-only memory (ROM). The memory device 320 may store a variety of information and may be used for various purposes. For example, the memory device 320 may store processor-executable instructions (e.g., firmware or software) for the processor 318 to execute, such as instructions for controlling the pneumatic source 312 and/or the valve assembly 314, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the pneumatic source and/or the valve assembly, etc.), and any other suitable data.

In the illustrated embodiment, the pneumatic support system 300' includes a user interface 322 communicatively coupled to the controller 316. The user interface 322 may enable an operator to instruct the controller 316 to adjust the contact force between the cutter bar assembly 202 and the soil surface. For example, the user interface 322 may include one or more input devices (e.g., button(s), knob(s), one or more switches, etc.) configured to receive an input indicative of a target contact force between the cutter bar assembly and the soil surface. In the illustrated embodiment, the user interface 322 includes a display 324 configured to present information to the operator (e.g., air pressure within the first, second, and fifth air bags, the contact force between the cutter bar assembly and the soil surface, etc.) and/or to enable the operator to provide input indicative of the target contact force between the cutter bar assembly and the soil surface (e.g., via a touchscreen interface).

The third air bag 308 is pneumatically isolated (e.g., fluidly isolated) from the pneumatic supply system 310, the first air bag 304, the second air bag 306, and the fifth air bag 311. In the illustrated embodiment, the third air bag is pneumatically sealed (e.g., fluidly sealed) and not fluidly coupled to another (e.g., second) pneumatic supply system of the pneumatic support system (e.g., at least during operation of the header). For example, a check valve may be coupled to the third air bag, and the air pressure within the third air bag may be adjusted by selectively opening the check valve to reduce the air pressure within the third air bag and providing pressurized air from an external source through the check valve to increase the air pressure within the third air bag. Furthermore, the fourth air bag 309 is pneumatically isolated (e.g., fluidly isolated) from the pneumatic supply system 310, the first air bag 304, the second air bag 306, and the fifth air bag 311. In the illustrated embodiment, the fourth air bag 309 is pneumatically sealed, not fluidly coupled to another (e.g., second) pneumatic supply system, and not fluidly coupled to the third air bag 308. For example, a check valve may be coupled to the fourth air bag, and the air pressure within the fourth air bag may be adjusted by selectively opening the check valve to reduce the air pressure within the fourth air bag and providing pressurized air from an external source through the check valve to increase the air pressure within the fourth air bag.

Prior to harvesting operations (e.g., during the manufacturing process of the header, before daily field operations, at periodic intervals, in response to changing the configuration of the header, etc.), the air pressure within the third air bag 308 and the fourth air bag 309 may be adjusted (e.g., by opening at least one check valve and/or by providing pressurized air from an external source through at least one check valve) such that the contact force between the cutter bar assembly and the soil surface at the infeed deck 234 is substantially equal to the contact force between the cutter bar assembly and the soil surface at the arms (e.g., while the first, second, and fifth air bags are pressurized to a standard operating pressure, such as an average air pressure during harvesting operations). By way of further example, prior to harvesting operations (e.g., during the manufacturing process of the header, before daily field operations, at periodic intervals, in response to changing the configuration of the header, etc.), the air pressure within the third air bag 308 and the fourth air bag 309 may be adjusted (e.g., by opening at least one check valve and/or by providing pressurized air from an external source through at least one check valve) such that the cutter bar assembly 202 is positioned above the soil surface and is substantially straight (e.g., while the first, second, and fifth air bags are pressurized to a pressure that causes the cutter bar assembly to be positioned above the soil surface). As such, the third air bag 308 and the fourth air bag 309 offset a particular portion of the weight of the infeed deck 234. In certain embodiments, the air pressure within the third air bag and the air pressure within the fourth air bag may be set equal to one another (e.g., in embodiments in which the third and fourth air bags have the same configuration). However, in other embodiments, the air pressure within the third air bag may be set to a different value than the air pressure within the fourth air bag. Furthermore, while the pneumatic support system includes two pneumatically isolated air bags coupled to the infeed deck in the illustrated embodiment, in other embodiments, the pneumatic support system may include more or fewer pneumatically isolated air bags coupled to the infeed deck (e.g., 1, 2, 3, 4, 5, 6, or more). For example, in certain embodiments, the fourth air bag may be omitted.

Once the air pressure(s) within the third air bag 308 and the fourth air bag 309 are set, the pressure(s) may not be adjusted during operation of the header 200. Accordingly, to control the position of the cutter bar assembly 202 relative to the soil surface and/or the contact force between the cutter bar assembly 202 and the soil surface, the pressure within the first air bag 302, the second air bag 304, and the fifth air bag 311 may be controlled via the pneumatic supply system 310. For example, an operator may input a target contact force between the cutter bar assembly 202 and the soil surface via the user interface 322 (e.g., via the display 324 of the user interface 322). The user interface 322, in turn, may output a signal to the controller 316 indicative of the target contact force. The controller 316 may then control the pneumatic source 312 and/or the valve assembly 314 to establish an air pressure within the first air bag 304, the second air bag 306, and the fifth air bag 311 that causes the cutter bar assembly 202 to apply substantially the target contact force to the soil surface. Because a particular portion of the weight of the infeed deck 234 is offset by the third air bag 308 and the fourth air bag 309, the contact force between the cutter bar assembly and the soil surface at the arms may be substantially equal to the contact force between the cutter bar assembly and the soil surface at the infeed deck. Establishing a substantially equal contact force across the cutter bar assembly may enable the cutter bar assembly to effectively follow the contours of the surface of the field. While the controller 316 is communicatively coupled to the pneumatic source 312 and the valve assembly 314 in the illustrated embodiment, in other embodiments, the controller may not be communicatively coupled to the pneumatic source (e.g., in embodiments in which the pneumatic source only includes a pneumatic tank). Furthermore, in certain embodiments, the controller may be omitted, and the valve assembly, and in certain embodiments the pneumatic source, may be manually controlled.

While a single air bag coupled to the infeed deck and fluidly coupled to the pneumatic supply system is disclosed above, in certain embodiments, one or more additional air bags may be coupled to the infeed deck and fluidly coupled to the pneumatic supply system. Furthermore, while the first air bag coupled to the first arm and fluidly coupled to the pneumatic supply system, and the fifth air bag coupled to the second arm and fluidly coupled to the pneumatic supply system are disclosed above, in certain embodiments, one air bag may be coupled to each respective arm and fluidly coupled to the pneumatic supply system. In addition, in certain embodiments, multiple air bags may be coupled to at least one arm, and/or multiple arms (e.g., 2, 3, 4, or more) may be coupled to a single air bag or group of air bags via a suitable linkage. In the illustrated embodiment, each air bag fluidly coupled to the pneumatic supply system is fluidly coupled in parallel to the pneumatic supply system. However, in other embodiments, at least a portion of the air bags may be fluidly coupled to the pneumatic supply system in a serial arrangement. Furthermore, in the illustrated embodiment, the air bags fluidly coupled to the pneumatic supply system are fluidly coupled to one another. Accordingly, the air pressures within the air bags are equal to one another. However, in other embodiments, at least one air bag may be fluidly coupled to the pneumatic supply system (e.g., the valve assembly of the pneumatic supply system) separately from at least one other air bag. Accordingly, the air pressures within certain air bags may be different from one another. In addition, while the third air bag 308 and the fourth air bag 309 are disclosed above as being pneumatically isolated from the pneumatic supply system 310, the first air bag 304, the second air bag 306, and the fifth air bag 311, in embodiments in which additional air bags 302 are fluidly coupled to the pneumatic supply system 310, the third and fourth air bags are also pneumatically isolated from such additional air bags.

In the illustrated embodiment, the air bags fluidly coupled to the pneumatic supply system are coupled to the infeed deck and to the arms, and the pneumatically isolated air bags are coupled to the infeed deck. However, in other embodiments, one or more air bags fluidly coupled to the pneumatic supply system may be coupled to other element(s) of the header, and/or one or more pneumatically isolated air bags may be coupled to other element(s) of the header. For example, in certain embodiments, at least a portion of the arms may be replaced with a side deck movably (e.g., pivotally) coupled to the frame of the header. In such embodiments, the side deck may support the cutter bar assembly and a respective lateral belt. In addition, one or more air bags fluidly coupled to the pneumatic supply system may be coupled to the side deck and to the frame of the header. Furthermore, in certain embodiments, at least one pneumatically isolated air bag may also be coupled to the side deck and to the frame of the header. For example, one pneumatically isolated air bag may be coupled to the side deck, and two pneumatically isolated air bags may be coupled to the infeed deck (e.g., in embodiments in which the infeed deck is heavier than the side deck).

Figure 6B:
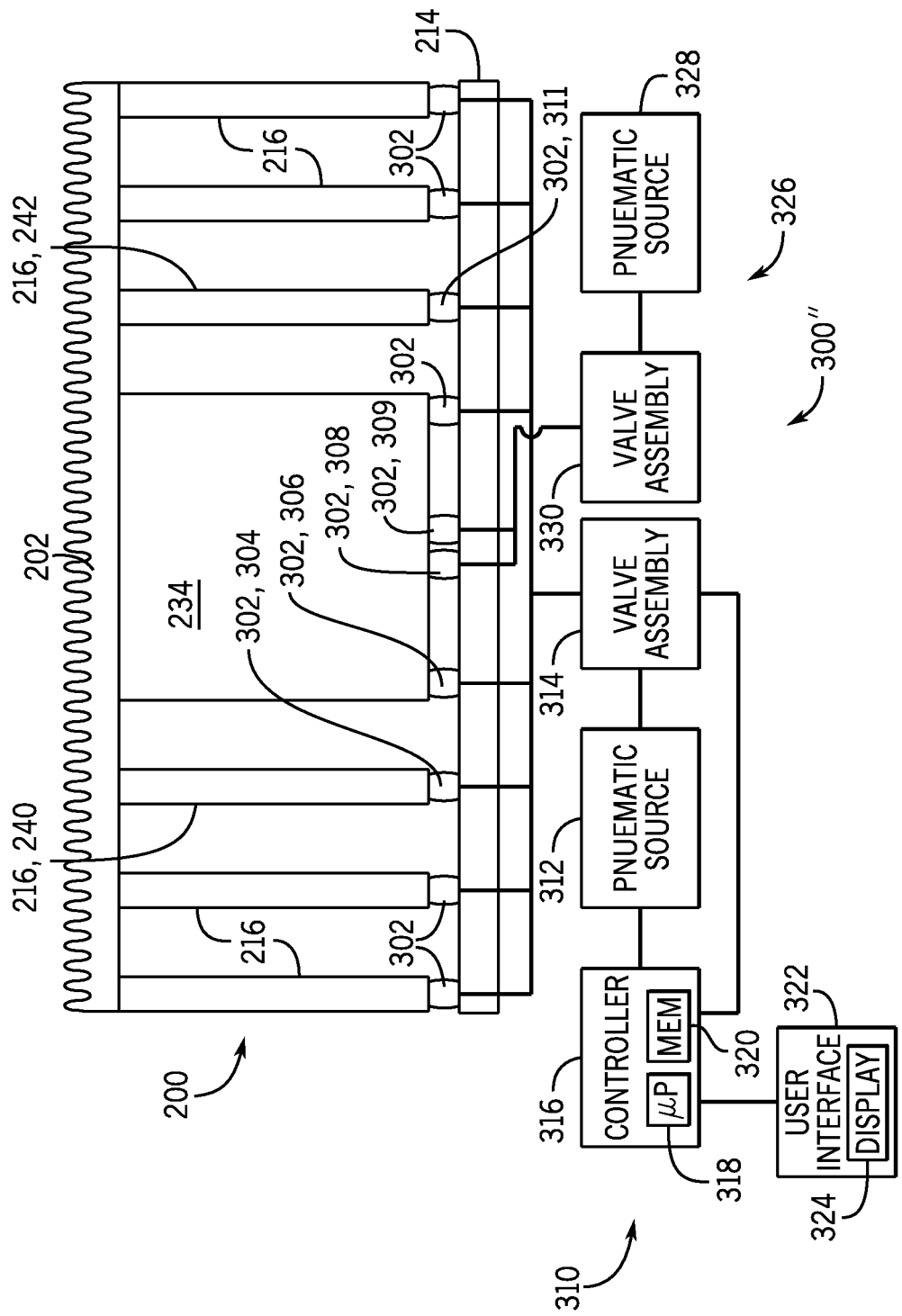
FIG. 6B is a schematic diagram of another embodiment of a pneumatic support system that may be employed within the header of FIG. 2.

FIG. 6B is a schematic diagram of another embodiment of a pneumatic support system 300" that may be employed within the header 200 of FIG. 2. As with the pneumatic supply system 300' described above with referenced to FIG. 6A, the third air bag 308 is pneumatically isolated from the pneumatic supply system 310, the first air bag 304, the second air bag 306, the fifth air bag 311, and any other air bags fluidly coupled to the pneumatic supply system 310. In addition, the fourth air bag 309 is pneumatically isolated from the pneumatic supply system 310, the first air bag 304, the second air bag 306, the fifth air bag 311, and any other air bags fluidly coupled to the pneumatic supply system 310. In the illustrated embodiment, the pneumatic support system 300" includes a second pneumatic supply system 326 (e.g., second fluid supply system) configured to provide pressurized air (e.g., pressurized fluid) to the third air bag 308 and the fourth air bag 309. As illustrated, the second pneumatic supply system 326 is pneumatically isolated (e.g., fluidly isolated) from the pneumatic supply system 310, the first air bag 304, the second air bag 306, the fifth air bag 311, and any other air bags fluidly coupled to the pneumatic supply system 310. In the illustrated embodiment, the second pneumatic supply system 326 includes a pneumatic source 328 and a valve assembly 330 fluidly disposed between the pneumatic source 328 and the third and fourth air bags. The valve assembly 330 is configured to control pressure within the third air bag 308 and the fourth air bag 309. The valve assembly may include one or more valves of any suitable type(s) (e.g., ball valve(s), butterfly valve(s), needle valve(s), etc.) to control air flow between the pneumatic source 328 and the third and fourth air bags. The valve assembly may also include one or more check valves and/or other suitable components to facilitate control of the air flow to the air bags.

In certain embodiments, the valve assembly 330 (e.g., the valve(s) of the valve assembly) is only manually adjustable. However, in other embodiments, the valve assembly 330 (e.g., the valve(s) of the valve assembly) may be controlled by a controller (e.g., the controller 316, another suitable controller, or a combination thereof). In addition, while the controller 316 is communicatively coupled to the pneumatic source 312 and the valve assembly 314 in the illustrated embodiment, in other embodiments, the controller may not be communicatively coupled to the pneumatic source 312 (e.g., in embodiments in which the pneumatic source 312 only includes a pneumatic tank). Furthermore, in certain embodiments, the controller may be omitted, and the valve assemblies, and in certain embodiments at least one pneumatic source, may be manually controlled. Furthermore, the pneumatic source 328 may include any suitable device(s) configured to provide pressurized air to the air bags, such as a pneumatic tank and/or a pneumatic pump.

Prior to harvesting operations (e.g., during the manufacturing process of the header, before daily field operations, at periodic intervals, in response to changing the configuration of the header, etc.), the air pressure within the third air bag 308 and the fourth air bag 309 may be adjusted via the valve assembly 330, such that the contact force between the cutter bar assembly and the soil surface at the infeed deck 234 is substantially equal to the contact force between the cutter bar assembly and the soil surface at the arms (e.g., while the first, second, and fifth air bags are pressurized to a standard operating pressure, such as an average air pressure during harvesting operations). By way of further example, prior to harvesting operations (e.g., during the manufacturing process of the header, before daily field operations, at periodic intervals, in response to changing the configuration of the header, etc.), the air pressure within the third air bag 308 and the fourth air bag 309 may be adjusted via the valve assembly 330, such that the cutter bar assembly 202 is positioned above the soil surface and is substantially straight (e.g., while the first, second, and fifth air bags are pressurized to a pressure that causes the cutter bar assembly to be positioned above the soil surface). As such, the third air bag 308 and the fourth air bag 309 offset a particular portion of the weight of the infeed deck 234.

In the illustrated embodiment, the third air bag 308 and the fourth air bag 309 are fluidly coupled to one another. Accordingly, the air pressure within the third air bag and the air pressure within the fourth air bag are equal to one another. However, in other embodiments, the third air bag may be fluidly coupled to the valve assembly 330 separately from the fourth air bag. Accordingly, the air pressure within the third air bag may be set to a different value than the air pressure within the fourth air bag. Furthermore, while the pneumatic support system 300" includes two air bags fluidly coupled to the second pneumatic supply system 326 and coupled to the infeed deck in the illustrated embodiment, in other embodiments, the pneumatic support system may include more or fewer air bags fluidly coupled to the valve assembly 330 and coupled to the infeed deck (e.g., 1, 2, 3, 4, 5, 6, or more). For example, in certain embodiments, the fourth air bag may be omitted.

In the illustrated embodiment, the air bags fluidly coupled to the pneumatic supply system 310 are coupled to the infeed deck and to the arms, and the air bags fluidly coupled to the second pneumatic supply system 326 are coupled to the infeed deck. However, in other embodiments, one or more air bags fluidly coupled to the pneumatic supply system 310 may be coupled to other element(s) of the header, and/or one or more air bags fluidly coupled to the second pneumatic supply system 326 may be coupled to other element(s) of the header. For example, in certain embodiments, at least a portion of the arms may be replaced with a side deck movably (e.g., pivotally) coupled to the frame of the header. In such embodiments, the side deck may support the cutter bar assembly and a respective lateral belt. In addition, one or more air bags fluidly coupled to the pneumatic supply system 310 may be coupled to the side deck and to the frame of the header. Furthermore, in certain embodiments, at least one air bag fluidly coupled to the second pneumatic supply system 326 may also be coupled to the side deck and to the frame of the header. For example, one air bag fluidly coupled to the second pneumatic supply system 326 may be coupled to the side deck, and two air bags fluidly coupled to the second pneumatic supply system 326 may be coupled to the infeed deck (e.g., in embodiments in which the infeed deck is heavier than the side deck). Any of the variations with respect to the pneumatic supply system 310 and the arrangement of air bags 302 fluidly coupled to the pneumatic supply system 310 disclosed above with reference to the pneumatic support system 300' of FIG. 6A may be included in the illustrated pneumatic support system 300" of FIG. 6B.

Figure 6C:
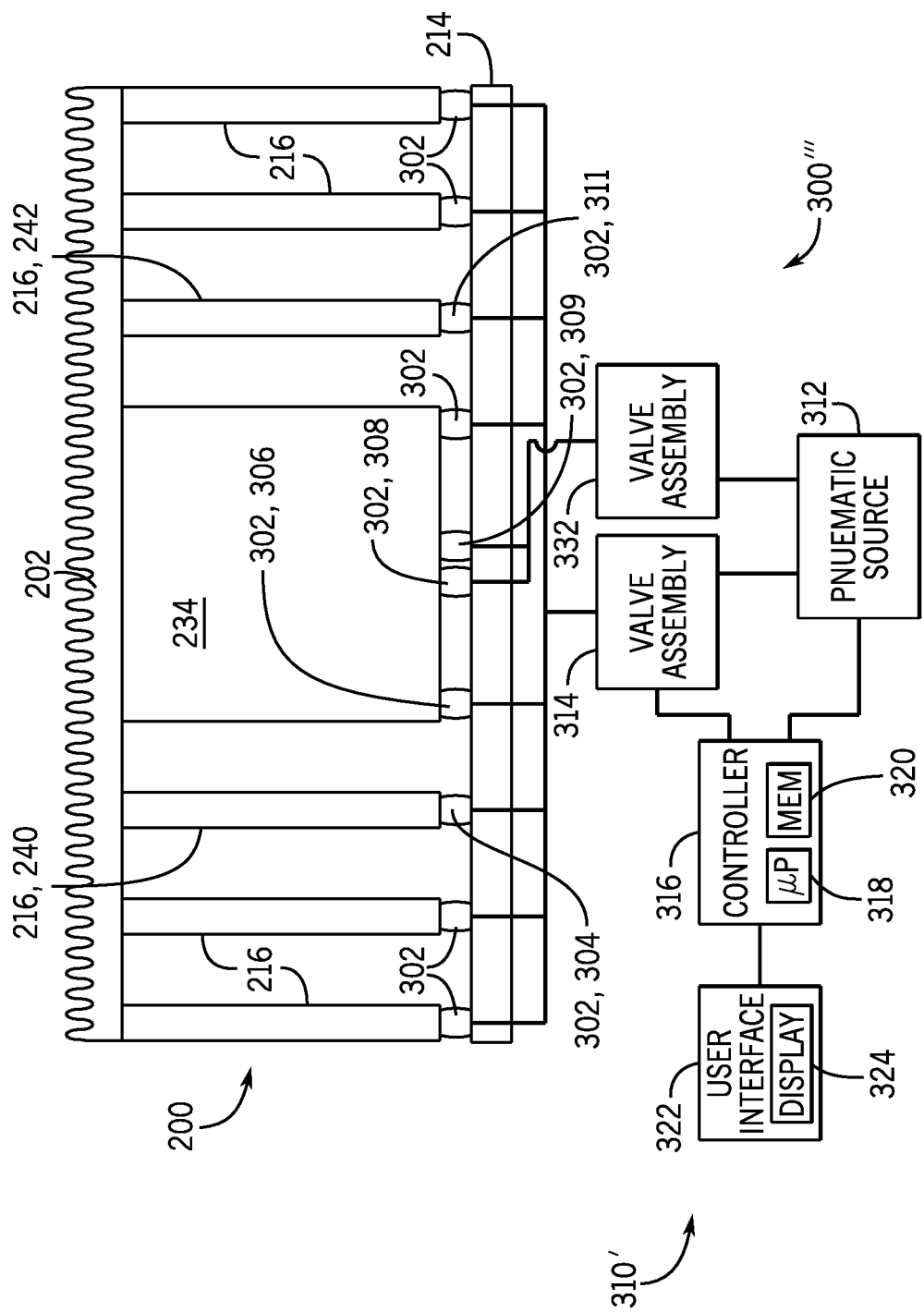
FIG. 6C is a schematic diagram of a further embodiment of a pneumatic support system that may be employed within the header of FIG. 2.

FIG. 6C is a schematic diagram of a further embodiment of a pneumatic support system 300'" that may be employed within the header 200 of FIG. 2. In the illustrated embodiment, the pneumatic supply system 310' includes a second valve assembly 332 fluidly disposed between the pneumatic source 312 and the third and fourth air bags. Accordingly, the pneumatic source 312 is configured to provide pressurized air to the first valve assembly 314 and to the second valve assembly 332, which in turn, are configured to provide the pressurized air from the pneumatic source 312 to the first air bag 304, the second air bag 306, the third air bag 308, the fourth air bag 309, and the fifth air bag 311. The second valve assembly 332 is configured to control pressure within the third air bag 308 and the fourth air bag 309. The valve assembly may include one or more valves of any suitable type(s) (e.g., ball valve(s), butterfly valve(s), needle valve(s), etc.) to control air flow between the pneumatic source 312 and the third and fourth air bags. The valve assembly may also include one or more check valves and/or other suitable components to facilitate control of the air flow to the air bags.

In certain embodiments, the second valve assembly 332 (e.g., the valve(s) of the second valve assembly) is only manually adjustable. However, in other embodiments, the second valve assembly 332 (e.g., the valve(s) of the second valve assembly) may be controlled by a controller (e.g., the controller 316, another suitable controller, or a combination thereof). While the controller 316 is communicatively coupled to the pneumatic source 312 and the first valve assembly 314 in the illustrated embodiment, in other embodiments, the controller may not be communicatively coupled to the pneumatic source 312 (e.g., in embodiments in which the pneumatic source only includes a pneumatic tank). Furthermore, in certain embodiments, the controller may be omitted, and the valve assemblies, and in certain embodiments the pneumatic source, may be manually controlled.

Prior to harvesting operations (e.g., during the manufacturing process of the header, before daily field operations, at periodic intervals, in response to changing the configuration of the header, etc.), the air pressure within the third air bag 308 and the fourth air bag 309 may be adjusted via the second valve assembly 332, such that the contact force between the cutter bar assembly and the soil surface at the infeed deck 234 is substantially equal to the contact force between the cutter bar assembly and the soil surface at the arms (e.g., while the first, second, and fifth air bags are pressurized to a standard operating pressure, such as an average air pressure during harvesting operations). By way of further example, prior to harvesting operations (e.g., during the manufacturing process of the header, before daily field operations, at periodic intervals, in response to changing the configuration of the header, etc.), the air pressure within the third air bag 308 and the fourth air bag 309 may be adjusted via the second valve assembly 332, such that the cutter bar assembly 202 is positioned above the soil surface and is substantially straight (e.g., while the first, second, and fifth air bags are pressurized to a pressure that causes the cutter bar assembly to be positioned above the soil surface). As such, the third air bag 308 and the fourth air bag 309 offset a particular portion of the weight of the infeed deck 234.

In the illustrated embodiment, the third air bag 308 and the fourth air bag 309 are fluidly coupled to one another. Accordingly, the air pressure within the third air bag and the air pressure within the fourth air bag are equal to one another. However, in other embodiments, the third air bag may be fluidly coupled to the second valve assembly separately from the fourth air bag. Accordingly, the air pressure within the third air bag may be set to a different value than the air pressure within the fourth air bag. Furthermore, while the pneumatic support system 300'" includes two air bags fluidly coupled to the second valve assembly 332 and coupled to the infeed deck in the illustrated embodiment, in other embodiments, the pneumatic support system may include more or fewer air bags fluidly coupled to the second valve assembly 332 and coupled to the infeed deck (e.g., 1, 2, 3, 4, 5, 6, or more). For example, in certain embodiments, the fourth air bag may be omitted.

In the illustrated embodiment, the air bags fluidly coupled to the first valve assembly 314 are coupled to the infeed deck and to the arms, and the air bags fluidly coupled to the second valve assembly 332 are coupled to the infeed deck. However, in other embodiments, one or more air bags fluidly coupled to the first valve assembly 314 may be coupled to other element(s) of the header, and/or one or more air bags fluidly coupled to the second valve assembly 332 may be coupled to other element(s) of the header. For example, in certain embodiments, at least a portion of the arms may be replaced with a side deck movably (e.g., pivotally) coupled to the frame of the header. In such embodiments, the side deck may support the cutter bar assembly and a respective lateral belt. In addition, one or more air bags fluidly coupled to the first valve assembly 314 may be coupled to the side deck and to the frame of the header. Furthermore, in certain embodiments, at least one air bag fluidly coupled to the second valve assembly 332 may also be coupled to the side deck and to the frame of the header. For example, one air bag fluidly coupled to the second valve assembly 332 may be coupled to the side deck, and two air bags fluidly coupled to the second valve assembly 332 may be coupled to the infeed deck (e.g., in embodiments in which the infeed deck is heavier than the side deck). Any of the variations with respect to the pneumatic supply system 310 and the arrangement of air bags 302 fluidly coupled to the pneumatic supply system 310 disclosed above with reference to the pneumatic support system 300' of FIG. 6A may be included in the illustrated pneumatic support system 300''' of FIG. 6C.

In certain embodiments, one or more pressure sensors and/or one or more pressure gauges may be fluidly coupled to one or more respective air bags, one or more respective valve assemblies, one or more respective pneumatic conduits, other suitable pneumatic component(s), or a combination thereof. For example, in the embodiment of the pneumatic support system 300' disclosed above with reference to FIG. 6A, a gauge may be fluidly coupled to the third air bag and/or the fourth air bag to facilitate control of the air pressure within the third air bag and/or the fourth air bag. Furthermore, with respect to the embodiment of the pneumatic support system 300'' disclosed above with reference to FIG. 6B and/or the embodiment of the pneumatic support system 300''' disclosed above with reference to FIG. 6C, one or more gauges may be fluidly coupled to the valve assembly that controls air flow to the third and fourth air bags to facilitate control of the air pressure within the third air bag and/or the fourth air bag. In addition, in certain embodiments, one or more pressure sensors may be configured to output signal(s) indicative of measured air pressure(s) within the first air bag, the second air bag, the fifth air bag, or a combination thereof. The controller may receive the signal(s) and adjust the air pressure(s) within the first air bag, the second air bag, the fifth air bag, or a combination thereof, based on the measured air pressure(s) and target air pressure(s). In certain embodiments, the sensor(s) may be positioned at the air bag(s), the valve assembly, the pneumatic source, or a combination thereof.

While the embodiments disclosed above include a pneumatic support system, certain embodiments may include another suitable support system, such as a hydraulic support system or a combined pneumatic/hydraulic support system. For example, with regard to the support system disclosed above with reference to FIG. 6A, each air bag fluidly coupled to the valve assembly may be replaced with a hydraulic actuator (e.g., a hydraulic cylinder). In addition, the pneumatic source may be replaced with a hydraulic source (e.g., hydraulic pump, hydraulic reservoir, etc.) to provide pressurized hydraulic fluid to the hydraulic actuators. In addition or alternatively, at least one pneumatically isolated air bag may be replaced with a fluidly isolated hydraulic actuator (e.g., including a hydraulic cylinder and an accumulator).

Furthermore, with regard to the support system disclosed above with reference to FIG. 6B, each air bag fluidly coupled to the valve assembly of the first supply system may be replaced with a hydraulic actuator (e.g., hydraulic cylinder). In addition, the pneumatic source of the first supply system may be replaced with a hydraulic source (e.g., hydraulic pump, hydraulic reservoir, etc.) to provide pressurized hydraulic fluid to the hydraulic actuators. In addition or alternatively, each air bag fluidly coupled to the valve assembly of the second supply system may be replaced with a hydraulic actuator (e.g., hydraulic cylinder), and the pneumatic source of the second supply system may be replaced with a hydraulic source (e.g., hydraulic pump, hydraulic reservoir, etc.) to provide pressurized hydraulic fluid to the hydraulic actuators.

In addition, with regard to the supply system disclosed above with reference to FIG. 6C, each of the air bags may be replaced with a hydraulic actuator (e.g., hydraulic cylinder). In addition, the pneumatic source may be replaced with a hydraulic source (e.g., hydraulic pump, hydraulic reservoir, etc.) to provide pressurized hydraulic fluid to the hydraulic actuators. While hydraulic and pneumatic actuators are described above, in certain embodiments, the support system may include at least one other suitable type of actuator, such as an electromechanical actuator (e.g., solenoid) or a controllable biasing element (e.g., adjustable spring assembly). For example, with regard to the support system disclosed above with reference to FIG. 6A, at least one pneumatically isolated air bag may be replaced with a controllable biasing element (e.g., adjustable spring assembly).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A support system for an agricultural header, comprising:
   a first actuator configured to couple to a frame of the agricultural header and to a first element of the agricultural header;
   a second actuator configured to couple to the frame of the agricultural header and to a second element of the agricultural header, wherein the first element and the second element are movable relative to the frame, and the first element and the second element are movable relative to one another;
   a third actuator configured to couple to the frame of the agricultural header and to the second element of the agricultural header; and
   a fluid supply system configured to provide pressurized fluid to the first actuator and to the second actuator, wherein the third actuator is fluidly isolated from the fluid supply system, the first actuator, and the second actuator.

2. The support system of claim 1, wherein:
the first element comprises an arm configured to support a cutter bar assembly of the agricultural header;
the second element comprises an infeed deck of the agricultural header; or
a combination thereof.

3. The support system of claim 1, wherein the fluid supply system comprises a fluid source and a valve assembly fluidly disposed between the fluid source and the first and second actuators, and the valve assembly is configured to control pressure within the first and second actuators.

4. The support system of claim 1, comprising a second fluid supply system configured to provide pressurized fluid to the third actuator, wherein the second fluid supply system is fluidly isolated from the fluid supply system, the first actuator, and the second actuator.

5. The support system of claim 1, wherein the third actuator is fluidly sealed and not fluidly coupled to a second fluid supply system of the support system.

6. The support system of claim 1, comprising a fourth actuator configured to couple to the frame of the agricultural header and to the second element of the agricultural header, wherein the fourth actuator is fluidly isolated from the fluid supply system, the first actuator, and the second actuator.

7. The support system of claim 6, wherein the third actuator and the fourth actuator are fluidly coupled to one another.

8. The support system of claim 1, comprising a fifth actuator configured to couple to the frame of the agricultural header and to a third element of the agricultural header, wherein the third element is movable relative to the frame, the first element, and the second element, and the fluid supply system is configured to provide pressurized fluid to the fifth actuator.

9. A support system for an agricultural header, comprising:
a first actuator configured to couple to a frame of the agricultural header and to a first element of the agricultural header;
a second actuator configured to couple to the frame of the agricultural header and to a second element of the agricultural header, wherein the first element and the second element are movable relative to the frame, and the first element and the second element are movable relative to one another;
a third actuator configured to couple to the frame of the agricultural header and to the second element of the agricultural header; and
a fluid supply system, comprising:
a fluid source configured to provide pressurized fluid to the first actuator, to the second actuator, and to the third actuator;
a first valve assembly fluidly disposed between the fluid source and the first and second actuators, wherein the first valve assembly is configured to control pressure within the first and second actuators; and
a second valve assembly fluidly disposed between the fluid source and the third actuator, wherein the second valve assembly is configured to control pressure within the third actuator.

10. The support system of claim 9, wherein:
the first element comprises an arm configured to support a cutter bar assembly of the agricultural header;
the second element comprises an infeed deck of the agricultural header; or
a combination thereof.

11. The support system of claim 9, comprising a controller having a memory and a processor, wherein the controller is communicatively coupled to the first valve assembly and configured to control the first valve assembly.

12. The support system of claim 11, wherein the second valve assembly is only manually adjustable.

13. The support system of claim 9, comprising a fourth actuator configured to couple to the frame of the agricultural header and to the second element of the agricultural header, wherein the second valve assembly is fluidly disposed between the fluid source and the fourth actuator, and the second valve assembly is configured to control pressure within the fourth actuator.

14. The support system of claim 9, comprising a fifth actuator configured to couple to the frame of the agricultural header and to a third element of the agricultural header, wherein the third element is movable relative to the frame, the first element, and the second element.

15. The support system of claim 14, wherein the first valve assembly is fluidly disposed between the fluid source and the fifth actuator, and the first valve assembly is configured to control pressure within the fifth actuator.

16. An agricultural header, comprising:
a frame;
a first element movably coupled to the frame;
a second element movably coupled to the frame and movable relative to the first element;
a support system, comprising:
a first actuator coupled to the frame and to the first element;
a second actuator coupled to the frame and to the second element;
a third actuator coupled to the frame and to the second element; and
a fluid supply system configured to provide pressurized fluid to the first actuator and to the second actuator, wherein the third actuator is fluidly isolated from the fluid supply system, the first actuator, and the second actuator.

17. The agricultural header of claim 16, wherein:
the first element comprises an arm configured to support a cutter bar assembly of the agricultural header;
the second element comprises an infeed deck of the agricultural header; or
a combination thereof.

18. The agricultural header of claim 16, wherein the fluid supply system comprises a fluid source and a valve assembly fluidly disposed between the fluid source and the first and second actuators, and the valve assembly is configured to control pressure within the first and second actuators.

19. The agricultural header of claim 16, wherein the support system comprises a second fluid supply system configured to provide pressurized fluid to the third actuator, and the second fluid supply system is fluidly isolated from the fluid supply system, the first actuator, and the second actuator.

20. The agricultural header of claim 16, wherein the third actuator is fluidly sealed and not fluidly coupled to a second fluid supply system of the support system.

* * * * *